United States Patent [19]

Nightingale et al.

[11] Patent Number: 5,170,409
[45] Date of Patent: Dec. 8, 1992

[54] LASER RESONATOR ASSEMBLY

[75] Inventors: John L. Nightingale, Portola Valley; John R. Harris, San Carlos; John K. Johnson, Woodside, all of Calif.

[73] Assignee: Coherent, Inc., Palo Alto, Calif.

[21] Appl. No.: 697,790

[22] Filed: May 9, 1991

[51] Int. Cl.[5] .............................................. H01S 3/08
[52] U.S. Cl. ..................................... 372/107; 372/99; 372/34; 372/101; 372/92
[58] Field of Search .................. 372/101, 107, 92, 94, 372/34, 99

[56] References Cited

U.S. PATENT DOCUMENTS 4,466,102  8/1984  Wöste .................................. 372/107
4,827,485  5/1989  Scerbak et al. ...................... 372/101

Primary Examiner—Léon Scott, Jr.
Attorney, Agent, or Firm—Limbach & Limbach

[57] ABSTRACT

A resonator assembly particularly suited for a diode pumped solid state laser is disclosed. The assembly includes a glass planar support plate 20. At least two transparent mirror mounts 26, 28 are bonded to the plate using a UV curable adhesive. The resonator mirrors 22, 24 are in turn bonded to the mounts using a similar adhesive. The structure is easy to align and assemble and is low in cost. In addition, the assembly can be formed from materials having a low coefficient of thermal expansion so that the thermal stability is enhanced. Further, the transparent mirror mounts provide enhanced stability while allowing transmission of laser radiation.

20 Claims, 1 Drawing Sheet

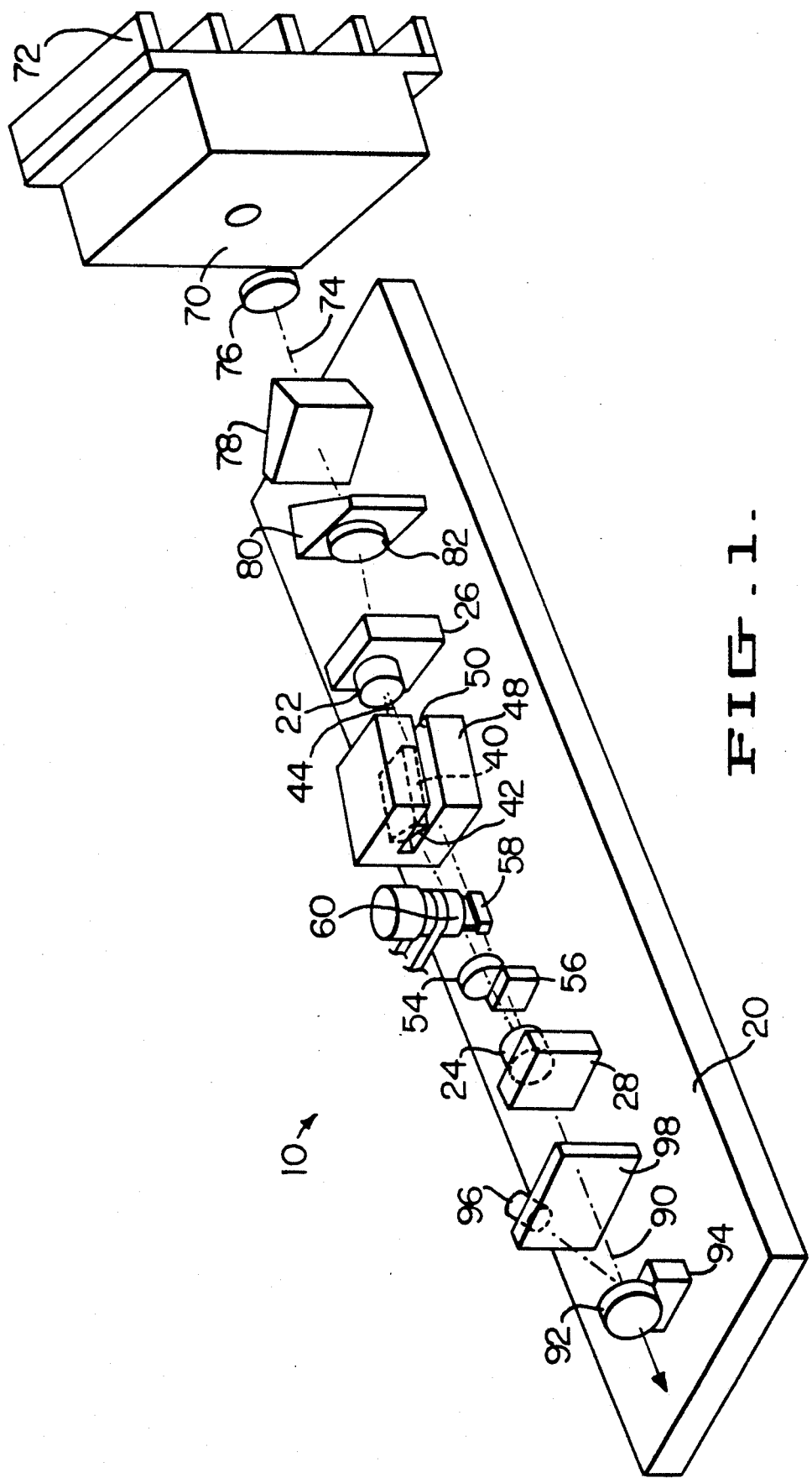

LASER RESONATOR ASSEMBLY

TECHNICAL FIELD

The subject invention relates to a resonator assembly particularly suited for diode pumped solid state lasers.

BACKGROUND OF THE INVENTION

Over the years, a considerable amount of effort has been directed to developing laser resonator assemblies. For commercial applications, resonator assemblies should be stable, sturdy, easy to build and relatively low in cost.

In the field of diode pumped solid state lasers, the resonator elements are often supported in a machined or cast fixture. More specifically, metal fixtures have been designed for receiving and supporting the laser gain medium and resonator mirrors. Examples of such resonator assemblies can be found in the following U.S. Pat. Nos. 4,730,335; 4,731,795; 4,890,296; 4,653,056; 4,656,635; and 4,665,529.

All of the latter designs have a number of drawbacks. For example, the machined or cast parts require relatively complex fabrication steps with close mechanical tolerancing. In addition, common metals which are used to form the assemblies have relatively high coefficients of thermal expansion. For example, the coefficient for aluminum is $24 \times 10^{-6}/C°$ while brass is $19 \times 10^{-6}/C°$. While some metal compounds, such as Invar, have much lower coefficients of thermal expansion, they are difficult to machine and are not generally used for these applications.

When the more common metals such as brass or aluminum are used to house the laser elements, the resonator dimensions will vary significantly with temperature changes. As the resonator dimensions change, the laser is subject to mode hops. These mode hops can result in amplitude instabilities in intracavity frequency doubled lasers and discontinuities in the frequency tuning for tunable single frequency lasers.

Accordingly, it is an object of the subject invention to provide a new optical assembly which is mechanically rigid.

It is another object of the subject invention to provide an optical assembly which has a low coefficient of thermal expansion and therefore is very stable with respect to temperature fluctuations.

It is a further object of the subject invention to provide a resonator assembly which has a coefficient of thermal expansion matched to the gain medium so that the change in mirror spacing causes a shift in the cavity axial mode frequency which tracks the frequency shift with temperature of the gain medium. This thermal matching allows continuous tuning of a single frequency laser by varying the temperature of the laser. The thermal matching also minimizes instabilities in a frequency doubled laser.

It is still another object of the subject invention to provide an optical design that is low in cost and easy to assemble.

It is still a further object of the subject invention to provide a mounting member for supporting an optical element wherein the mounting member is aligned with and transparent to laser radiation.

SUMMARY OF THE INVENTION

In accordance with these and many other objects the subject invention provides for a resonator assembly having a planar support plate formed from a transparent material. A pair of mirror mounts are bonded to the support plate by a UV curable adhesive. The adhesive is of the type the remains viscous until subjected to UV radiation. Accordingly, during fabrication of the assembly, the position of the mirror mounts can be continuously adjusted until they are properly aligned. UV radiation is then directed through the transparent support plate to cure the adhesive and fix the mounts in place.

The resonator mirrors can then be attached to the mirror mounts. In the preferred embodiment, the mirror mounts are also transparent and a UV curable adhesive is used to bond the mirrors to the mounts. By this arrangement, during assembly, the position of the mirrors can be adjusted until the cavity is aligned. Then UV radiation is passed through the mirror mounts to fix the position of the mirrors.

As can be appreciated, the subject approach facilitates assembly and alignment of the resonator. In addition, the mounting system is mechanically strong. Further, the transparent mirror mounts allow radiation to pass into and out of the resonant cavity.

Another advantage to the subject approach is that the support plate and the mirror mounts can be formed from materials with relatively low coefficients of thermal expansion thereby increasing the stability of the system. In the preferred embodiment, the transparent support plate is formed from glass having a coefficient of thermal expansion significantly lower than common metals. If maximum stability is desired for single frequency operation, the support plate is formed from fused silica or other commercially available composite glasses. Alternatively, the material for the support plate can be selected so that as the temperature of the gain medium is varied to vary the output frequency of the laser, the axial modes in the resonant cavity will change in frequency at approximately the same rate so that mode hopping can be minimized. In the illustrated embodiment of a diode pumped, Nd:YAG laser, the support plate is formed from Pyrex.

A further advantage of the subject approach is that the planar support plate lends itself to the construction of planar and near planar ring resonators.

Further objects and advantages of the subject invention will be appreciated by referring to the following detail taken in conjunction with the drawings in which:

BRIEF DESCRIPTION OF THE DRAWING

FIG. 1 is a perspective view of a laser having a resonator formed in accordance with the subject invention.

DETAILED DESCRIPTION OF THE PREFERRED EMBODIMENT

Turning to FIG. 1, there is illustrated a laser 10 formed in accordance with the subject invention. The laser 10 is a unidirectional, diode pumped, frequency doubled Nd:YAG laser. A planar ring configuration is created with a pair of mirrors and an angled refracting surface formed on the gain material. More details regarding the specifics of the laser itself can be found in copending application Ser. No. 07/509,627, filed Apr. 13, 1990 and incorporated herein by reference.

In accordance with the subject invention, the resonator of the laser 10 is mounted on a planar support plate 20. Planar support plate 20 is transparent to UV radiation. By transparent, it is meant that the material will transmit at least five percent of the UV radiation. In the preferred embodiment, the plate is formed from glass.

In this laser, the resonator is defined by a pair of mirrors 22 and 24. Each of these mirrors are supported by mirror mounts 26 and 28, respectively. In the preferred embodiment, the mirror mounts are formed from fused silica which is transparent to UV radiation.

In accordance with the subject invention, the mirrors 22, 24 are bonded to the mounts 26, 28 and the mounts bonded to the support plate 20 using a UV curable adhesive. There are a number of UV curable adhesives available on the market. These adhesives come in a variety of viscosities. One adhesive which has been found suitable for use herein is Norland 61. This adhesive is quite good for bonding planar parts. If the parts are not planar, a more viscous adhesive, such as Norland 68 would be preferred. In accordance with the subject invention, the primary bonded surfaces of the resonator are all planar to maximize mechanical strength.

The basic elements discussed above would be sufficient to form a conventional linear resonator in accordance with the subject invention. In the preferred method, the mirror mounts 26 and 28 are placed on the support plate as close as possible to the desired location. A template can be used to locate the mirror mounts. A sufficient quantity of the UV curable adhesive is applied between the support plate and the mirror mounts. Since the adhesive will remain uncured, the position of the parts can be continuously adjusted until proper alignment is achieved. At this time, UV radiation can be directed through the support plate to cure the adhesive. In the preferred embodiment, a fiber optic cable is used to deliver light from an arc lamp to a spot underneath the support plate and then direct the light upwardly so that the UV radiation will penetrate up through the support plate. When subjected to UV radiation, the adhesive will cure in a approximately one minute.

Once the mirror mounts are in place, the mirrors 22 and 24 can be attached thereto. In the preferred embodiment, the mirrors are planoconcave. The planar side of the mirrors are attached to the one of the planar sides of the mirror mounts.

In a manner similar to that discussed above, the mirrors are placed in their approximate position with the UV adhesive between the mirror and the mount. The placement of the mirror can then be adjusted by sliding its plane surface over the plane surface of the mirror mount. As is well known, by translating a planoconcave mirror in this manner, the angular alignment of the resonator can be varied. For optimal results, the alignment process can be performed while the laser is running. Once the cavity is aligned, UV radiation can be shined through the mirror mounts to cure the adhesive and set the mirror position. By using a thin, planar adhesive layer, dimensional changes associated with the adhesive curing process are minimized.

As can be appreciated, this approach provides a resonator assembly with excellent structural rigidity. In addition, the parts can be easily aligned and manufactured at low cost. The support plate can also be formed from a material with a low coefficient of thermal expansion so that the stability of the laser is enhanced.

The remainder of the elements illustrated in the Figures and used in the commercial embodiment of the subject invention will now be discussed.

Laser 10 includes a solid state gain medium defined by a block of Nd:YAG 40. One face 42 of the gain medium 40 is angled in a manner to deflect the angle of the laser beam 44 by refraction. Angled face 42 in conjunction with mirrors 22 and 24 cooperate to define the ring path of the beam.

Gain medium 40 is mounted in a magnet 48. Magnet 48 is U-shaped in configuration and the gain medium is received in the slot 50 thereof. The magnet is used to generate a nonreciprocal polarization rotation of the beam based on the Faraday effect. Magnet 48 is bonded to the support plate using a UV curable adhesive. In the preferred embodiment, the positions of the two mirrors 22 and 24 and the gain medium 40 are adjusted and aligned before the adhesives are set.

In order to force the laser into unidirectional operation, an element which creates reciprocal polarization is also necessary. In the illustrated embodiment, this effect is achieved by mounting a quartz rotator plate 54 at Brewster's angle in the path of the beam. Plate 54 is bonded to a mount 56 which is turn bonded to the support plate 20. In the preferred embodiment, mount 56 is formed from aluminum and is bonded to the support plate with a UV curable adhesive.

The final element illustrated within the resonant cavity is a KTP crystal 58 for second harmonic generation. The crystal 58 is connected to Peltier cooler 60 to allow temperature control of the KTP. The connection also allows the angle of the crystal to be adjusted relative to the support plate 20 to ensure optimum phasematching conditions. The cooler is, in turn, bonded to the support plate.

The gain medium 40 is optically pumped from light from a laser diode 70. Laser diode 70 is mounted to a heat sink 72. The heat sink 72 is bonded to the support plate. Light 74 from the diode 70 is collimated by lens 76 and then directed into the cavity by a pair of anamorphic prisms 78 and 80 and a focusing lens 82. The prisms 78 and 80 are bonded to the support plate by a UV curable adhesive and function to shape the diode beam to achieve a better mode match with the beam circulating in the resonator.

As seen in FIG. 1, the beam 74 from diode laser 70 passes directly through the transparent mirror mount 26 and into the resonant cavity. Since the mount is transparent it can be formed as a solid member without any aperture for transmitting the pump beam. In this manner, the structural rigidity of the mount is enhanced.

The circulating fundamental beam 44 is frequency doubled by the KTP crystal 58 The doubled beam 90 passes out of the cavity through output coupler mirror 26 and directly through transparent mirror mount 28. A lens 92 for collimating the doubled beam 90 can be provided. Lens 92 is connected to an aluminum mount 94 which is in turn adhesively bonded to the support plate.

In the preferred embodiment, a photocell 96 is provided to monitor the output power of the doubled beam 90. Photocell is mounted in a manner to detect a back reflection from lens 92. Photocell is connected to a mount 98 which is in turn adhesively bonded to the support plate 20. Mount 98 is formed from Schott filter glass, #BG 40, which filters any light from the fundamental beam or pump light emerging from the cavity while allowing the doubled green light at 532 nm to enter lens 92. Photocell 96 is affixed on the back side of the mount so that the light is filtered twice.

As noted above, one advantage to the subject resonator assembly is that the glass support plate will provide greater mechanical stability with respect to temperature changes when compared to the metal support structures used in the prior art. If maximum stability at a fixed wavelength is desired, the plate can be formed from a material such as fused silica which has a coefficient of thermal expansion of $4.0 \times 10^{-7}/C°$. Another possibility is a composite glass sold under the trademark Zerodur by the Schott glass company and having a coefficient of thermal expansion less than $1.5 \times 10^{-7}/C°$.

In the preferred embodiment of the subject invention, the support plate is formed from Pyrex which has a coefficient of thermal expansion of $3.3 \times 10^{-6}/C°$ which is greater than that of fused silica but is well matched to the performance of the Nd:YAG gain medium. As noted above, the frequency output of these types of lasers is typically tuned by varying the temperature of the gain medium. If the mirror spacing is fixed, changing the temperature of the gain medium will eventually result in a mode hop. However, if the resonator spacing can be changed in a manner to track the change in output frequency from the gain medium, the bandwidth which can be scanned before a mode hop occurs can be increased.

To achieve this goal, the laser is tuned by changing the temperature of both the gain medium and the support plate with a conventional temperature controller (not shown). As the output frequency of the gain medium is decreased by increasing its temperature, the support plate will expand such that the spacing between the mirrors 22 and 24 will also increase, decreasing the frequency of the lasing axial modes and reducing the occurrence of mode hops.

Another advantage to the use of a planar support plate is that it lends itself to the easy fabrication of planar and near planar ring resonator structures as well as to the mounting of other optical elements located before or after the resonator. Alignment of the optical elements can be easily achieved by mounting each of the elements a similar distance from the planar surface of the support plate. The optical plane of the elements will then be parallel with the plane of the support plate. In the illustrated embodiment, the plane of the resonant ring is 6 mm from the plane of the plate.

Although providing the bonded surfaces with a planar configuration is preferable, it is also possible to use the UV curable adhesive in conjunction with gimbal type mounting structures. For example, the bottom of the mirror mounts can be provided with a spherical configuration which contacts the planar support plate. The angle of the mirror mount can then be adjusted to the desired orientation and then fixed by exposing the adhesive to UV radiation.

It would also be possible to mount the mirror directly to the support plate. In this case, it would be desirable to have a spherical radius on the bottom of the mirror.

When using UV curable adhesive it is only necessary that one of the parts be transparent. In the preferred embodiment, both the support plate and the mirror mounts are transparent. In this manner, the mirrors can be attached to the mounts with the UV adhesive. In addition, the input pump beam and the doubled output beam can pass directly through the transparent mounts.

A ring laser assembled in accordance with the above description was operated unidirectionally and pumped with 450 mW of incident light from a laser diode. When the laser was operated without a nonlinear optical material in the cavity, stable single frequency output of 120 mW at 1064 nm was achieved. When a 5 mm long KTP crystal was added into the ring, stable single frequency output of 19 mW at 532 nm was achieved.

While the subject invention has been described with reference to a laser, it could be used in other optical layouts such as an external resonant ring. In addition, the subject approach could be used to fabricate the optical layout for a structure employed for directly doubling diodes.

In summary, there has been disclosed a new approach for constructing a resonator particularly suited for a diode pumped solid state laser. The assembly includes a transparent planar support plate. At least two transparent mirror mounts are bonded to the plate using a UV curable adhesive. The resonator mirrors are in turn bonded to the mounts using a similar adhesive. The structure is easy to align and assemble and is low in cost. In addition, the assembly can be formed from materials having a low coefficient of thermal expansion so that stability can be enhanced. Further, the transparent mirror mounts provide enhanced stability while allowing transmission of laser radiation.

While the subject invention has been described with reference to a preferred embodiment, other changes and modifications could be made therein, by one skilled in the art, without varying from the scope and spirit of the subject invention as defined by the appended claims.

We claim:

1. A resonator assembly comprising:
   a support plate;
   at least one mirror mount wherein both said plate and said mirror mount are formed from a material transparent to UV radiation; and
   adhesive means connecting said mount to said plate, said adhesive means having been cured by UV radiation passing through said transparent material to define a thermally stable assembly.

2. A resonator assembly comprising:
   a support plate;
   at least one mirror mount, with either said plate or said mount being formed from a material transparent to UV radiation;
   adhesive means connecting said mount to said plate, said adhesive means having been cured by UV radiation passing through said transparent material; and
   a mirror adhesively connected to said mirror mount and wherein the surface of said mount and mirror bonded by the adhesive are planar and the opposed surface of said mirror is curved whereby angular alignment of the resonator assembly is facilitated.

3. A resonator assembly comprising:
   a support plate formed from glass;
   at least one mirror mount; and
   adhesive means connecting said mount to said plate, said adhesive means having been cured by UV radiation passing through said glass support plate to define a thermally stable assembly.

4. A resonator assembly comprising:
   a support plate formed from borosilicate glass;
   at least one mirror mount; and
   adhesive means connecting said mount to said plate, said adhesive means having been cured by UV radiation passing through said Pyres support plate to define a thermally stable assembly.

5. A resonator assembly comprising:
   a support plate formed from fused silica;
   at least one mirror mount; and adhesive means connecting said mount to said plate, said adhesive means having been cured by UV radiation passing through said fused silica support plate to define a thermally stable assembly.

6. A laser comprising:
a planar support plate formed from a material that is transparent to UV radiation;
a pair of mirror mounts formed from a material that is transparent to UV radiation, said mirror mounts being adhesively bonded to the support plate;
an optical resonator including a pair of mirrors each of which is adhesively bonded to one of the mirror mounts, wherein said adhesive bonding said mirror mounts to the support plate and the adhesive bonding said mirror mounts to said mirrors is cured by UV radiation;
a solid state gain medium connected to said support plate between said mirrors; and
means for generating radiation for optically pumping said gain medium, said radiation passing through one of said mirrors and the mirror mount adhesively bonded thereto prior to entering said gain medium to define a thermally stable assembly.

7. A laser as recited in claim 6 wherein said support plate is formed from a material having a low coefficient of thermal expansion.

8. An assembly as recited in claim 6 wherein said support plate is formed from fused silica.

9. A laser as recited in claim 6 wherein said support plate is formed from a material having a coefficient of thermal expansion selected such that any frequency shifts of the modes of the optical resonator caused by changes in the temperature of the laser will be similar to the temperature frequency shifts of the radiation from the solid state gain medium.

10. A laser as recited in claim 9 further including a means for varying the temperature of the gain medium and the support plate to tune the output of the laser without causing mode hopping.

11. An assembly as recited in claim 10 wherein said gain medium is formed from Nd:YAG and said support plate is formed from borosilicate glass.

12. A laser as recited in claim 6 wherein said gain medium is mounted in a magnet which is adhesively bonded to the support plate.

13. A method of fabricating a resonator assembly comprising the steps of:
forming a planar support plate from glass;
forming a pair of mirror mounts for attachment to the support plate;
applying a UV curable adhesive between the support plate and the mirror mounts; and
directing UV radiation to the adhesive through the support plate to cure the adhesive to define a thermally stable assembly.

14. A method of fabricating a resonator assembly comprising the steps of:
forming a planar support plate from borosilicate glass;
forming a pair of mirror mounts for attachment to the support plate;
applying a UV curable adhesive between the support plate and the mirror mounts; and
directing UV radiation to the adhesive through the support plate to cure the adhesive to define a thermally stable assembly.

15. A method of fabricating a resonator assembly comprising the steps of:
forming a planar support plate from fused silica;
forming a pair of mirror mounts for attachment to the support plate;
applying a UV curable adhesive between the support plate and the mirror mounts; and
directing UV radiation to the adhesive through the support plate to cure the adhesive to define a thermally stable assembly.

16. A method of fabricating a resonator assembly comprising the steps of:
forming a planar support plate from a material transparent to UV radiation and from a material having a low coefficient of thermal expansion;
forming a pair of mirror mounts for attachment to the support plate;
applying a UV curable adhesive between the support plate and the mirror mounts; and
directing UV radiation to the adhesive through the support plate to cure the adhesive to define a thermally stable assembly.

17. A optical assembly comprising:
a planar support plate formed from borosilicate glass;
a mounting member attached to said support plate; and
an optical element connected to said mounting member to define a thermally stable assembly.

18. A optical assembly comprising:
a planar support plate formed from fused silica;
a mounting member attached to said support plate; and
an optical element connected to said mounting member to define a thermally stable assembly.

19. A method of assembling and adjusting the angular alignment of a resonator, said resonator including a mirror having a curved reflecting surface and an opposed planar attachment surface, said resonator further including a mirror mount having a planar attachment surface, and wherein either said mirror or said mount is formed from a material that is transparent to UV radiation, said method comprising the steps of:
placing the planar attachment surface of the mirror into contact with the planar attachment surface of the mirror mount with a UV curable adhesive located therebetween;
adjusting the position of the mirror by sliding the mirror with respect to the mount along the opposed planar attachment surfaces until the desired angular alignment of the resonator is achieved; and
directing UV radiation to the adhesive through the transparent material to cure the adhesive and bond the mirror to the mount in the desired position whereby the angular alignment of the resonator assembly is facilitated.

20. A method as recited in claim 19 wherein during said adjusting step, a laser beam is directed to and is reflected off of said the curved reflecting surface of said mirror.

* * * * *